(12) United States Patent
Nishiyama et al.

(10) Patent No.: US 9,362,585 B2
(45) Date of Patent: Jun. 7, 2016

(54) FUEL CELL STACK

(71) Applicant: HONDA MOTOR CO., LTD., Minato-Ku, Tokyo (JP)

(72) Inventors: Tadashi Nishiyama, Sakura (JP); Yusuke Nara, Utsunomiya (JP); Kimiharu Mizusaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 409 days.

(21) Appl. No.: 13/758,085

(22) Filed: Feb. 4, 2013

(65) Prior Publication Data

US 2013/0202983 A1   Aug. 8, 2013

(30) Foreign Application Priority Data

Feb. 7, 2012  (JP) .................................. 2012-024390
Dec. 5, 2012  (JP) .................................. 2012-266404

(51) Int. Cl.
 *H01M 8/24* (2016.01)
 *H01M 8/10* (2016.01)

(52) U.S. Cl.
 CPC ...... *H01M 8/248* (2013.01); *H01M 2008/1095* (2013.01); *Y02E 60/50* (2013.01)

(58) Field of Classification Search
 CPC .................................................... H01M 8/248
 USPC .......................................................... 429/465
 See application file for complete search history.

(56) References Cited

U.S. PATENT DOCUMENTS

| 6,511,766 B1* | 1/2003 | Loutfy et al. ................. 429/454 |
| 2008/0305368 A1* | 12/2008 | Takahashi et al. .............. 429/12 |
| 2011/0294030 A1 | 12/2011 | Yamamoto |
| 2012/0021326 A1* | 1/2012 | Morimoto et al. ............ 429/465 |

FOREIGN PATENT DOCUMENTS

| JP | 2006-040845 A | 2/2006 |
| JP | 2006-331648 A | 12/2006 |
| JP | 2007-294243 A | 8/2007 |
| JP | 2007-294243 A | 11/2007 |
| JP | 2009-070674 | * 4/2009 ............. H01M 8/24 |
| JP | 2009-199815 A | 9/2009 |
| JP | 2010-211992 A | 9/2010 |
| WO | 2010/090003 A1 | 8/2010 |

OTHER PUBLICATIONS

Office Action dated Apr. 8, 2014 issued over the corresponding Japanese Patent Application No. 2012-266404 with the English translation of pertinent portion thereof.

* cited by examiner

*Primary Examiner* — Ula C Ruddock
*Assistant Examiner* — Osei Amponsah
(74) *Attorney, Agent, or Firm* — Carrier Blackman & Associates, P.C.; William D. Blackman; Joseph P. Carrier (57) ABSTRACT

A fuel cell stack includes fuel cells stacked in a stacking direction, a first end plate a second end plate, and first tightening members and second tightening members. The first tightening members couple long sides of the first end plate and long sides of the second end plate, and extend in the stacking direction. The second tightening members couple short sides of the first end plate and short sides of the second end plate, and extend in the stacking direction. Extensions are formed on both of long sides of the fuel cell, and the first tightening members have recessed portions engaged with the extensions.

13 Claims, 8 Drawing Sheets

FUEL CELL STACK

CROSS-REFERENCE TO RELATED APPLICATIONS

This application is based upon and claims the benefit of priority from Japanese Patent Applications No. 2012-024390 filed on Feb. 7, 2012 and No. 2012-266404 filed on Dec. 5, 2012, the contents all of which are incorporated herein by reference.

BACKGROUND OF THE INVENTION

1. Field of the Invention

The present invention relates to a fuel cell stack including a plurality of fuel cells and a first end plate and a second end plate each having a laterally elongated shape. Each of the fuel cells is formed by stacking a membrane electrode assembly and a separator horizontally in a stacking direction. The membrane electrode assembly includes a pair of electrodes and an electrolyte interposed between the electrodes. The first end plate and the second end plate are provided at both ends of the fuel cells in the stacking direction.

2. Description of the Related Art

For example, a solid polymer electrolyte fuel cell includes a power generation cell formed by sandwiching a membrane electrode assembly (MEA) between separators. The membrane electrode assembly includes an electrolyte membrane, an anode provided on one surface of the electrolyte membrane, and a cathode provided on the other surface of the electrolyte membrane. The electrolyte membrane is a polymer ion exchange membrane. In the fuel cell, normally a predetermined number of power generation cells are stacked together to form a fuel cell stack, e.g., mounted in a vehicle.

In the case where the fuel cell stack is used, in particular, in a vehicle, it is required to stack a considerably large number of power generation cells. Thus, the power generation cells need to be positioned, and held together precisely and securely.

Figure 8:
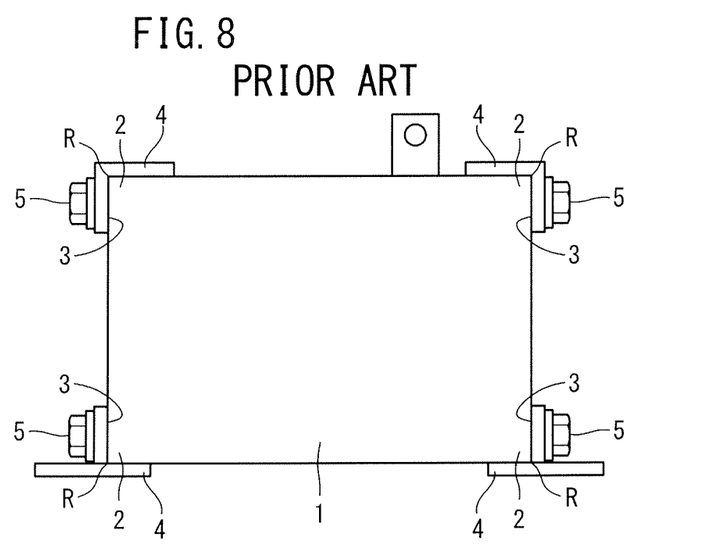
FIG. 8 is view showing a fuel cell stack disclosed in conventional technique.

In this regard, for example, a fuel cell stack disclosed in Japanese Laid-Open Patent Publication No. 2006-040845 (hereinafter referred to as conventional technique) is known. In the fuel cell stack, as shown in FIG. 8, a plurality of fuel cells each having a polygonal shape are stacked together to from a fuel cell stack body. Current collecting plates are provided at both ends of the fuel cell stack body, insulating plates are provided outside the current collecting plates, and end plates 1 are provided outside the insulating plates. The fuel cell stack is formed in a polygonal columnar shape as a whole.

Load support members 4 are provided to cover corners 2 of the fuel cell stack. Each of the load support members 4 includes a corner cover portion 3 having an L shape in cross section to cover the ridge line R of the corner 2. Load maintaining member 5 is provided for the load support member 4, for maintaining a load applied to components between the end plates 1 at both ends.

SUMMARY OF THE INVENTION

In the conventional technique, the load support member 4 as an angle member is provided at each of four corners of the fuel cell stack. However, normally, at the four corners of the fuel cell stack, fluid (fuel gas, oxygen-containing gas, or coolant) passages are provided, and the strength tends to be insufficient. Therefore, in particular, in the case where the fuel cell stack is used in a vehicle, the impact load from the outside cannot be received sufficiently.

The present invention has been made to solve the problems of this type, and an object of the present invention is to provide a fuel cell stack having simple and compact structure where the external load applied to a fuel cell is received reliably, and the positional displacement of the fuel cell is suppressed as much as possible.

The present invention relates to a fuel cell stack including a plurality of fuel cells and a first end plate and a second end plate each having a laterally elongated shape. Each of the fuel cells is formed by stacking a membrane electrode assembly and a separator horizontally in a stacking direction. The membrane electrode assembly includes a pair of electrodes and an electrolyte membrane interposed between the electrodes. The first end plate and the second end plate are provided at both ends of the fuel cells in the stacking direction.

The fuel cell stack includes a first tightening member and a second tightening member. The first tightening member couples a long side of the first end plate and a long side of the second end plate, and extends in the stacking direction. The second tightening member couples a short side of the first end plate and a short side of the second end plate, and extends in the stacking direction. The fuel cell includes an extension arranged in the stacking direction is formed on the long side, and the first tightening member has a recessed portion engaged with a plurality of the extensions, and the recessed portion extends in the stacking direction.

In the present invention, the first tightening member couples the first end plate and the second end plate. The extensions formed on long sides of the fuel cells are engaged with the recessed portion of the first tightening member.

In the structure, when the external load is applied to the fuel cell stack, by engagement of the recessed portion and the extensions, the external load can be received reliably. Thus, with simple and compact structure, the positional displacement of the fuel cells can be suppressed as much as possible.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
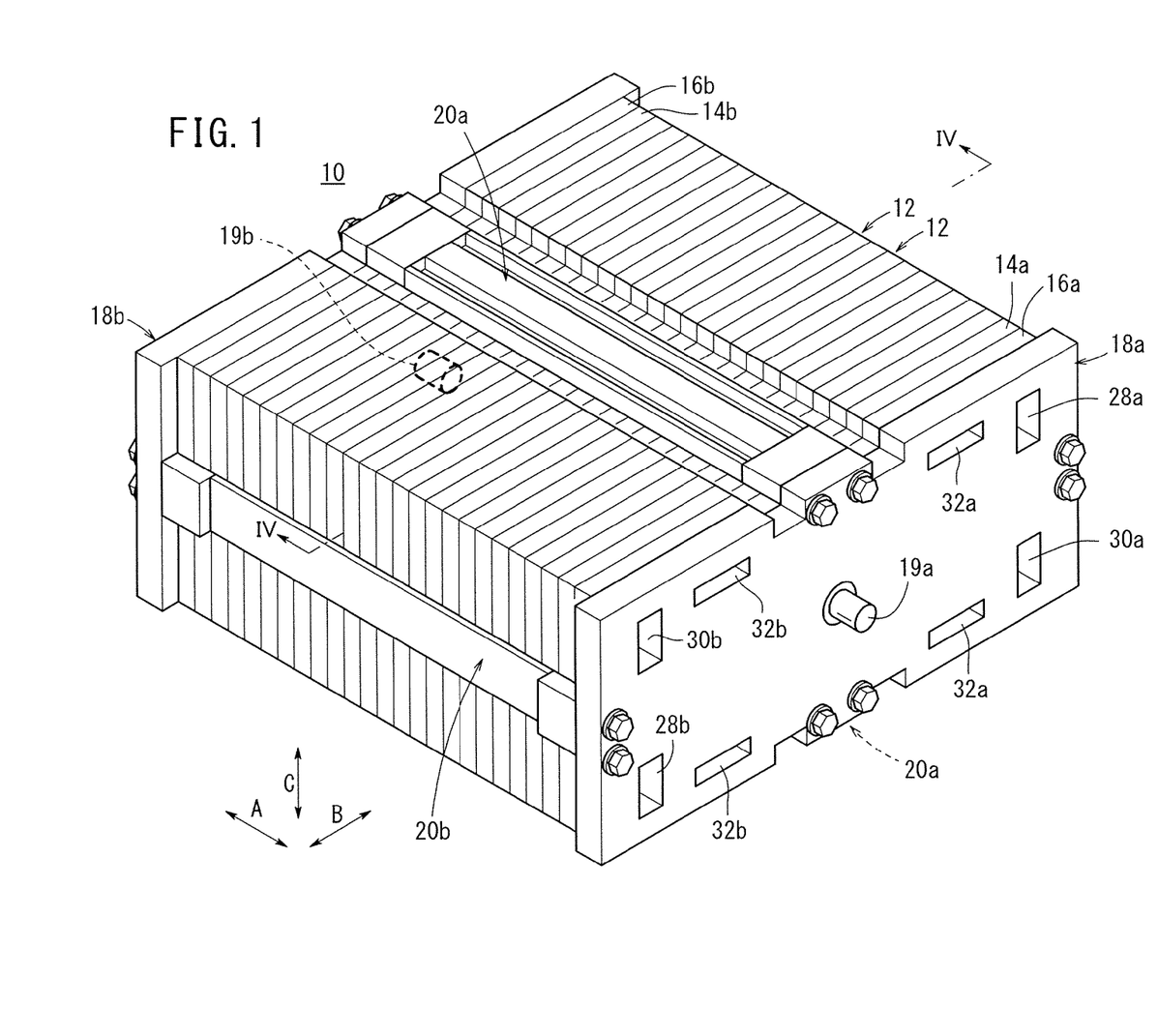
FIG. 1 is a perspective view schematically showing a fuel cell stack according to a first embodiment of the present invention.

A fuel cell stack 10 according to a first embodiment of the present invention shown in FIG. 1 is mounted in a fuel cell vehicle. A plurality of fuel cells 12 oriented upright are stacked together in a width direction of the vehicle indicated by an arrow A to form the fuel cell stack 10. The vehicle width direction intersects a travel direction of the fuel cell vehicle indicated by an arrow B.

At both ends of the fuel cell 12 in the stacking direction, terminal plates 14a, 14b are provided. Insulating plates 16a, 16b are provided outside the terminal plates 14a, 14b, and a first end plate 18a and a second end plate 18b are provided outside the insulating plates 16a, 16b. An output terminal 19a connected to the terminal plate 14a extend from a central portion of the first end plate 18a, and an output terminal 19b connected to the terminal plate 14b extends from a central portion of the second end plate 18b.

Each of the first end plate 18a and the second end plate 18b has a rectangular shape elongated in a lateral direction. First tightening members (coupling bars) 20a are provided between long sides of the first end plate 18a and long sides of the second end plate 18b, and second tightening members (coupling bars) 20b are provided between short sides of the first end plate 18a and short sides of the second end plate 18b.

Figure 2:
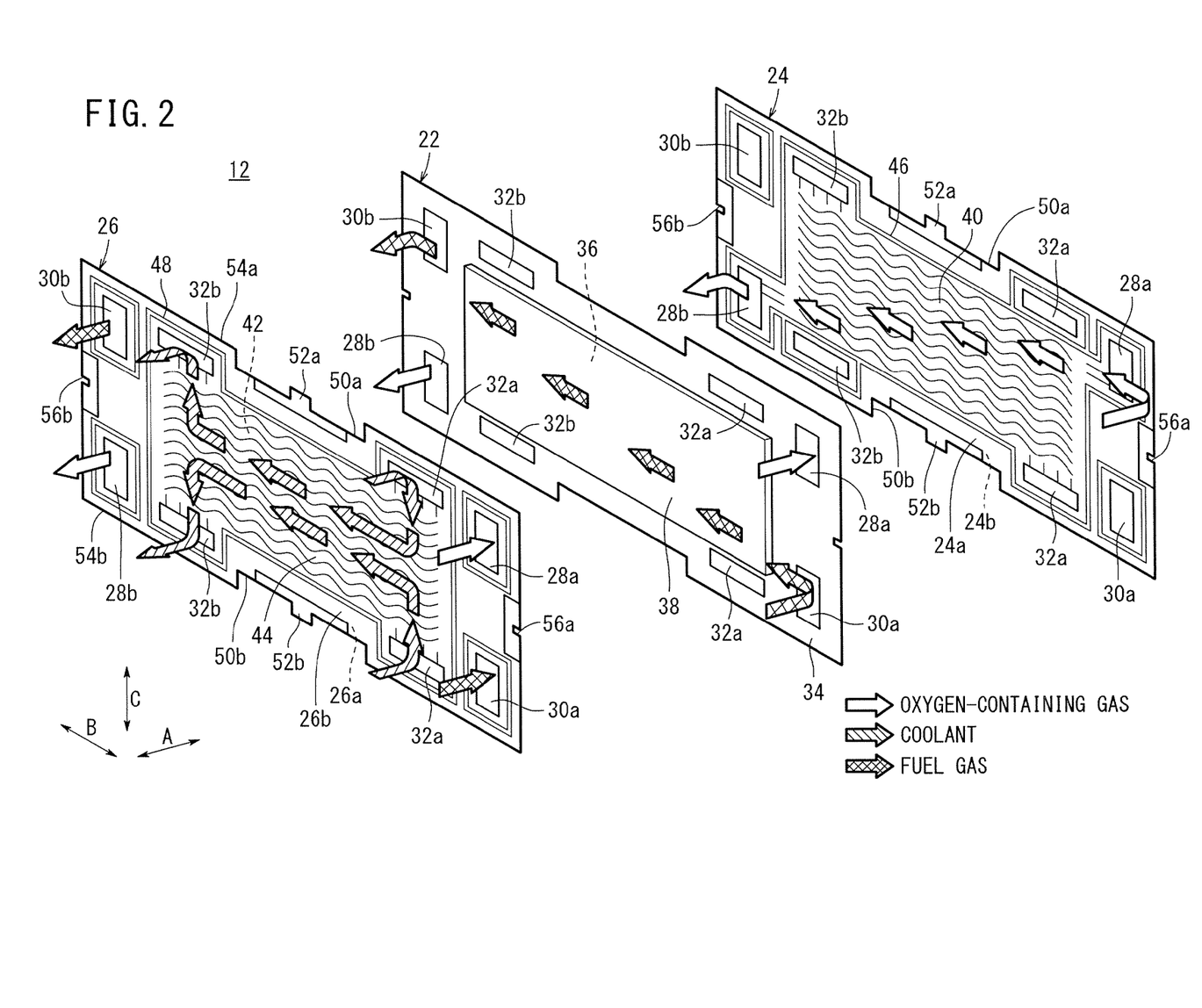
FIG. 2 is an exploded perspective view showing main components of a fuel cell of the fuel cell stack.

As shown in FIG. 2, the fuel cell 12 includes a membrane electrode assembly 22 and a first metal separator 24 and a second metal separator 26 sandwiching the membrane electrode assembly 22.

For example, the first metal separator 24 and the second metal separator 26 are made of metal plates such as steel plates, stainless steel plates, aluminum plates, plated steel sheets, or metal plates having anti-corrosive surfaces by surface treatment. For example, the first metal separator 24 and the second metal separator 26 have rectangular planar surfaces, and are formed by corrugating metal thin plates by pressing to have a corrugated shape in cross section. Instead of the first and second metal separators 24, 26, for example, carbon separators may be used.

Each of the first metal separator 24 and the second metal separator 26 has a laterally elongated shape. Long sides of the first metal separator 24 and the second metal separator 26 extend in a horizontal direction indicated by the arrow B, and short sides of the first metal separator 24 and the second metal separator 26 extend in the direction of gravity indicated by the arrow C. The first metal separator 24 and the second metal separator 26 are stacked in the horizontal direction indicated by the arrow A. Alternatively, short sides of the first metal separator 24 and the second metal separator 26 may extend in the horizontal direction, and long sides of the first metal separator 24 and the second metal separator 26 may extend in the direction of gravity.

At one end of the fuel cell 12 in the longitudinal direction indicated by the arrow B, an oxygen-containing gas supply passage (fluid passage) 28a for supplying an oxygen-containing gas, and a fuel gas supply passage (fluid passage) 30a for supplying a fuel gas such as a hydrogen-containing gas are provided. The oxygen-containing gas supply passage 28a and the fuel gas supply passage 30a extend through the fuel cells 12 in the direction indicated by the arrow A.

At the other end of the fuel cell 12 in the longitudinal direction, a fuel gas discharge passage (fluid passage) 30b for discharging the fuel gas and an oxygen-containing gas discharge passage (fluid passage) 28b for discharging an oxygen-containing gas are provided. The fuel gas discharge passage 30b and the oxygen-containing gas discharge passage 28b extend through the fuel cells 12 in the direction indicted by the arrow A.

At both ends of the fuel cell 12 in the lateral direction indicated by the arrow C, two coolant supply passages (fluid passages) 32a for supplying a coolant are provided oppositely on one side (reactant gas inlet side). At both ends of the fuel cell 12 in the lateral direction, two coolant discharge passages (fluid passages) 32b for discharging the coolant are provided oppositely on the other side (reactant gas outlet side).

At one end of the fuel cell 12 in the longitudinal direction, the oxygen-containing gas supply passage 28a, the fuel gas supply passage 30a, and the pair of the coolant supply passages 32a are provided. At the other end of the fuel cell 12 in the longitudinal direction, the fuel gas discharge passage 30b, the oxygen-containing gas discharge passage 28b, and the pair of the coolant discharge passages 32b are provided. The positions and numbers of the fluid passages are not limited to the ones in the present embodiment, insofar as these passages are arranged on both ends of the separators in the longitudinal direction.

The membrane electrode assembly 22 includes a cathode 36, an anode 38, and a solid polymer electrolyte membrane 34 interposed between the cathode 36 and the anode 38. For example, the solid polymer electrolyte membrane 34 is formed by impregnating a thin membrane of perfluorosulfonic acid with water.

Each of the cathode 36 and the anode 38 has a gas diffusion layer (not shown) such as a carbon paper, and an electrode catalyst layer (not shown) having platinum alloy supported on porous carbon particles. The carbon particles are deposited uniformly on the surface of the gas diffusion layer. The electrode catalyst layer of the anode 38 and the electrode catalyst layer of the cathode 36 are fixed to both surfaces of the solid polymer electrolyte membrane 34, respectively.

The first metal separator 24 has an oxygen-containing gas flow field 40 on its surface 24a facing the membrane electrode assembly 22. The oxygen-containing gas flow field 40 is connected to the oxygen-containing gas supply passage 28a and the oxygen-containing gas discharge passage 28b. The oxygen-containing gas flow field 40 includes a plurality of corrugated and wavy flow grooves extending in the direction indicated by the arrow B.

The second metal separator 26 includes a fuel gas flow field 42 on its surface 26a facing the membrane electrode assembly 22. The fuel gas flow field 42 is connected to the fuel gas supply passage 30a and the fuel gas discharge passage 30b. The fuel gas flow field 42 includes a plurality of corrugated and wavy flow grooves extending in the direction indicated by the arrow B.

A coolant flow field 44 connected to the coolant supply passages 32a and the coolant discharge passages 32b are formed between a surface 26b of the second metal separator 26 and a surface 24b of the first metal separator 24. The coolant flows along the coolant flow field 44 over the electrode area of the membrane electrode assembly 22.

A first seal member 46 is formed integrally with the surfaces 24a, 24b of the first metal separator 24, around the outer end of the first metal separator 24. A second seal member 48 is formed integrally with the surfaces 26a, 26b of the second metal separator 26, around the outer end of the second metal separator 26.

Each of the first seal member 46 and the second seal members 48 is made of seal material, cushion material, or packing material such as an EPDM (ethylene propylene diene monomer) rubber, an NBR (nitrile butadiene rubber), a fluoro rubber, a silicone rubber, a fluorosilicone rubber, a Butyl rubber, a natural rubber, a styrene rubber, a chloroprene rubber, or an acrylic rubber.

In the fuel cell 12, central portions of both of long sides (upper end and lower end in FIG. 2) of the first metal separator 24 and the second metal separator 26 are cut inwardly to form cutouts 50a, 50b, and extensions 52a, 52b are provided integrally or separately with substantially central portions of the cutouts 50a, 50b. For example, the extensions 52a, 52b are made of insulative resin material, and formed integrally with the first metal separator 24 and the second metal separator 26. Alternatively, the extensions 52a, 52b may be made of metal plates formed integrally with the first metal separator 24 and the second metal separator 26, and insulating treatment may be applied to surfaces of the extensions 52a, 52b.

The extensions 52a, 52b are arranged in the stacking direction. The extensions 52a of the first and second metal separators 24, 26 are jointly engaged with (fitted to), and the extensions 52b of the first and second metal separators 24, 26 are jointly engaged with (fitted to) a recessed portion 64 (described later) of each of first tightening members 20a. The outer surfaces of the extensions 52a, 52b indicated by the arrow C are positioned inside outer surfaces 54a, 54b of the long sides of the fuel cell 12.

Recessed portions 56a, 56b are formed integrally with, or separately from substantially intermediate portions at both of short sides (left and right sides in FIG. 2) of the first metal separator 24 and the second metal separator 26. Alternatively, the recessed portions 56a, 56b may be arranged point-symmetrically on the respective opposite short sides. The recessed portion 56a is made of insulative resin material as with the extensions 52a, 52b, and provided between the oxygen-containing gas supply passage 28a and the fuel gas supply passage 30a. The recessed portion 56b is made of resin material having good insulating property as with the extensions 52a, 52b, and provided between the oxygen-containing gas discharge passage 28b and the fuel gas discharge passage 30b. Alternatively, the recessed portions 56a, 56b may be made of metal plates formed integrally with the first metal separator 24 and the second metal separator 26, and insulating treatment may be applied to surfaces of the recessed portions 56a, 56b. The recessed portion 56a and the recessed portion 56b are arranged in the stacking direction, and as described later, ridges 76 of the second tightening members 20b are jointly engaged with (fitted to) the recessed portion 56a and the recessed portion 56b.

Figure 3:
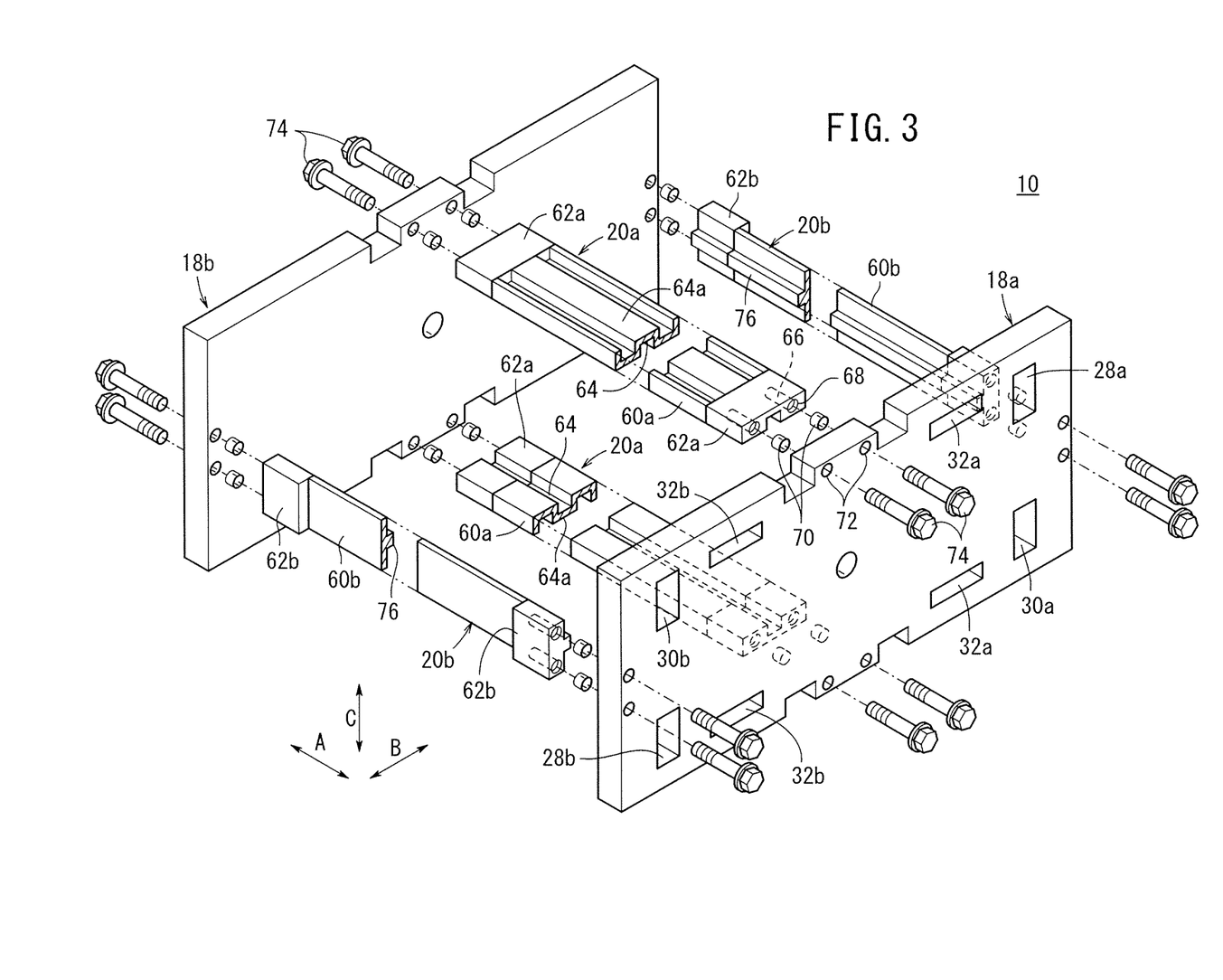
FIG. 3 is an exploded perspective view showing end plates, first tightening members, and second tightening members of the fuel cell stack.

As shown in FIG. 3, the first tightening member 20a includes a plate section 60a formed by extrusion, and attachment sections 62a fixed to both ends of the plate section 60a in the longitudinal direction. For example, the plate section 60a and the attachment sections 62a are welded together, or formed integrally by cutting. Alternatively, the plate section 60a and the attachment sections 62a may be formed integrally by casting or forging.

Figure 4:
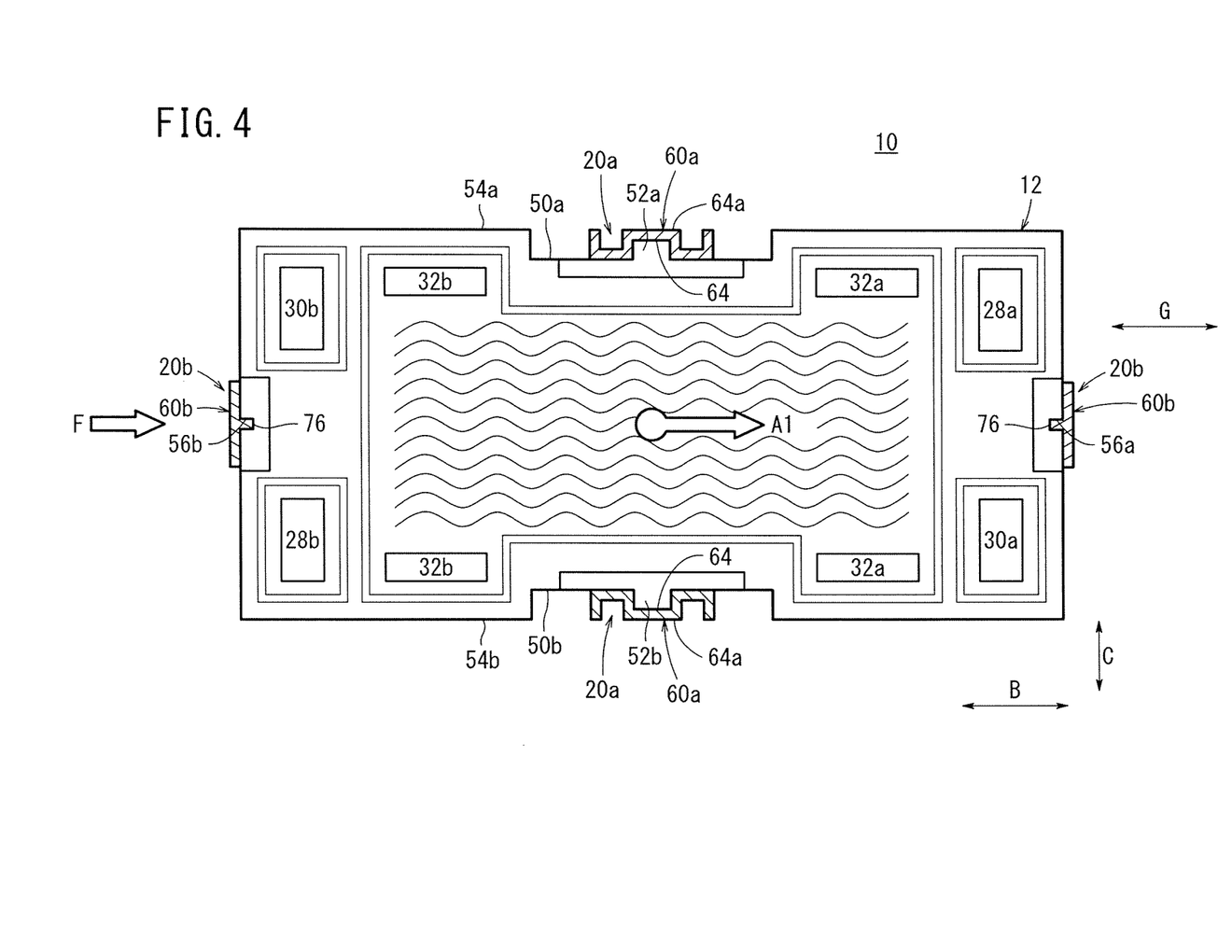
FIG. 4 is a cross sectional view showing the fuel cell stack, taken along a line IV-IV in FIG. 1.

As shown in FIG. 4, the plate section 60a has a bent shape in cross section, and has the recessed portion 64 which extends in the stacking direction and which is engaged with the extensions 52a (52b) of the fuel cell 12. The top of the extensions 52a (52b) and the bottom of the recessed portion 64 may contact each other, or a predetermined gap may be formed between the top of extension 52a (52b) and the bottom of recessed portion 64.

The outer surfaces 64a of the first tightening members 20a are positioned inside the outer surfaces 54a, 54b of the long sides of the fuel cell 12. Recesses are provided on both sides of the outer surface 64a of the plate section 60a to reduce the weight. It should be noted that no recesses may be formed to increase the bending strength.

The attachment sections 62a are thicker than the plate section 60a. Two screw holes 66 and two positioning holes 68 are formed coaxially at each of the end surfaces facing the first end plate 18a and the second end plate 18b (see FIG. 3). Positioning rings 70 are fitted to the positioning holes 68, and the rings 70 are fitted to two holes 72 described later, respectively. The rings 70 are fitted to both of the positioning holes 68 and the holes 72. In the structure, the shearing load can be received through the rings 70.

The two holes 72 are formed in the first end plate 18a and the second end plate 18b, respectively, at each of central portions of the long sides. Bolts 74 inserted into the holes 72 are also inserted into the rings 70, and front ends of the bolts 74 are screwed into the screw holes 66. Alternatively, three or more bolts 74 may be provided.

The second tightening member 20b includes a plate section 60b formed by extrusion, and attachment sections 62b fixed to both ends of the plate section 60b in the longitudinal direction. The thickness of the plate section 60b is smaller than the thickness of each of the attachment sections 62b. For example, the plate section 60b and the attachment sections 62b are welded together, or formed by cutting. Alternatively, the plate section 60b and the attachment sections 62b may be formed integrally by casting or forging.

As shown in FIG. 4, the plate section 60b has the ridge 76 engaged with the recessed portion 56a (56b) of the fuel cell 12, on its side surface facing the fuel cell 12. The ridge 76 extends in the stacking direction. On the outside of the stack, the thickness of the second tightening member 20b in the direction indicated by the arrow B is reduced as much as possible.

The attachment section 62b has the same structure as the attachment section 62a of the first tightening member 20a. The constituent elements that are identical to those of the attachment section 62a of the first tightening member 20a are labeled with the same reference numerals, and description thereof will be omitted.

As shown in FIG. 1, the oxygen-containing gas supply passage 28a, the fuel gas supply passage 30a, the oxygen-containing gas discharge passage 28b, the fuel gas discharge passage 30b, the coolant supply passages 32a, and the coolant discharge passages 32b are formed in the first end plate 18a. Manifold members (not shown) are connected to the oxygen-containing gas supply passage 28a, the fuel gas supply passage 30a, the oxygen-containing gas discharge passage 28b, the fuel gas discharge passage 30b, the coolant supply passages 32a, and the coolant discharge passages 32b.

Alternatively, the oxygen-containing gas supply passage 28a, the fuel gas supply passage 30a, the oxygen-containing gas discharge passage 28b, and the fuel gas discharge passage 30b may be formed in the first end plate 18a, and the coolant supply passages 32a and the coolant discharge passages 32b may be formed in the second end plate 18b.

Operation of the fuel cell stack 10 will be described below.

Firstly, as shown in FIG. 1, an oxygen-containing gas is supplied to the oxygen-containing gas supply passage 28a of the first end plate 18a, and a fuel gas is supplied to the fuel gas supply passage 30a. Further, a coolant such as pure water, ethylene glycol, or oil is supplied to the pair of the coolant supply passages 32a.

Thus, the oxygen-containing gas flows from the oxygen-containing gas supply passage 28a into the oxygen-containing gas flow field 40 of the first metal separator 24. The oxygen-containing gas moves along the oxygen-containing gas flow field 40 in the direction indicated by the arrow B, and the oxygen-containing gas is supplied to the cathode 36 of the membrane electrode assembly 22.

In the meanwhile, the fuel gas is supplied from the fuel gas supply passage 30a to the fuel gas flow field 42 of the second metal separator 26. The fuel gas moves along the fuel gas flow field 42 in the direction indicated by the arrow B, and the fuel gas is supplied to the anode 38 of the membrane electrode assembly 22.

Thus, in each of the membrane electrode assemblies 22, the oxygen-containing gas supplied to the cathode 36, and the fuel gas supplied to the anode 38 are partially consumed in the electrochemical reactions at catalyst layers of the cathode 36 and the anode 38 for generating electricity.

Next, the oxygen-containing gas partially consumed at the cathode 36 of the membrane electrode assembly 22 is discharged along the oxygen-containing gas discharge passage 28b in the direction indicated by the arrow A. In the meanwhile, the fuel gas partially consumed at the anode 38 of the membrane electrode assembly 22 is discharged along the fuel gas discharge passage 30b in the direction indicated by the arrow A.

Further, the coolant supplied to the pair of coolant supply passages 32a is supplied into the coolant flow field 44 between the first metal separator 24 and the second metal separator 26. The coolant temporarily flows inward in the direction indicated by the arrow C, and then, the coolant moves in the direction indicated by the arrow B to cool the membrane electrode assembly 22. After the coolant moves outward in the direction indicated by the arrow C, the coolant is discharged along the pair of coolant discharge passages 32b in the direction indicated by the arrow A.

In the first embodiment, as shown in FIGS. 1, 3, and 4, the pair of first tightening members 20a couples the long sides of the first end plate 18a and the long sides of the second end plate 18b. The extensions 52a, 52b formed in both of long sides of the fuel cell 12 are engaged with the recessed portions 64 of the first tightening members 20a such that the extensions are fitted into the recessed portions, as shown.

In the structure, as shown in FIG. 4, when the external load F is applied to the fuel cell stack 10 toward the back side in the travel direction of the vehicle indicated by the arrow A1, by engagement of the recessed portions 64 and the extensions 52a, 52b, the external load F can be received reliably. Thus, with simple and compact structure, positional displacement of the fuel cell 12 in the direction indicated by the arrow A can be suppressed as much as possible.

Further, both of the short sides of the fuel cell 12 have recessed portions 56a, 56b between the oxygen-containing gas supply passage 28a and the fuel gas supply passage 30a, and between the fuel gas discharge passage 30b and the oxygen-containing gas discharge passage 28b. The recessed portions 56a, 56b are arranged in the stacking direction, respectively. The pair of second tightening members 20b has the ridges 76 that are engaged with the recessed portions such that the ridges are fitted into the recessed portions 56a, 56b and extend in the stacking direction. Positions of the recessed portions 56a, 56b are not limited to the intermediate portions of the short sides, and the recessed portions 56a, 56b can be provided at various positions, e.g., at symmetrical positions offset from each other, on the opposite short sides.

In the structure, thanks to the second tightening member 20b, no positional displacement in the direction indicated by the arrow C occurs in the fuel cell 12. Further, the second tightening member 20b is thin, and has a flat outer surface. The second tightening member 20b protrudes outward in the direction indicated by the arrow B to a small extent. Therefore, reduction in the overall size of the fuel cell stack 10 in the direction indicated by the arrow B is achieved.

Further, the fuel cell 12 has the oxygen-containing gas supply passage 28a, the fuel gas supply passage 30a, and the pair of coolant supply passages 32a at one end in the longitudinal direction, and has the fuel gas discharge passage 30b, the oxygen-containing gas discharge passage 28b, and the pair of coolant discharge passages 32b at the other end in the longitudinal direction. Further, the cutouts 50a, 50b are formed on both of long sides at the central portions by cutting the long sides inwardly, and the extensions 52a, 52b are provided at substantially the central portions of the cutouts 50a, 50b.

In the state where the extensions 52a, 52b of the fuel cell 12 are engaged with the recessed portions 64 of the first tightening members 20a, the outer surfaces 64a of the first tightening member 20a are positioned inside the outer surfaces 54a, 54b of the long sides of the fuel cell 12. In the structure, the first tightening members 20a do not protrude outward from the outer surfaces 54a, 54b of the fuel cell 12, and the overall height of the fuel cell stack 10 in the direction indicated by the arrow C is reduced as much as possible.

Further, the first end plate 18a and the second end plate 18b are tightly coupled to each of both ends of the first tightening member 20a using two bolts 74, and the rings 70 are provided concentrically around the bolts 74. The rings 70 are fitted to the first end plate 18a and the first tightening member 20a, and to the second end plate 18b and the first tightening member 20a. The first end plate 18a and the second end plate 18b are tightly coupled to each of both ends of the second tightening member 20b using two bolts 74, and the rings 70 are provided concentrically around the bolts 74. The rings 70 are fitted to the first end plate 18a and the second tightening member 20b, and to the second end plate 18b and the second tightening member 20b.

Thus, the first tightening member 20a and the second tightening member 20b, and the first end plate 18a and the second end plate 18b are positioned, and held together precisely and securely. Further, it is possible to reliably suppress rotation of the first tightening member 20a and the second tightening member 20b.

Figure 5:
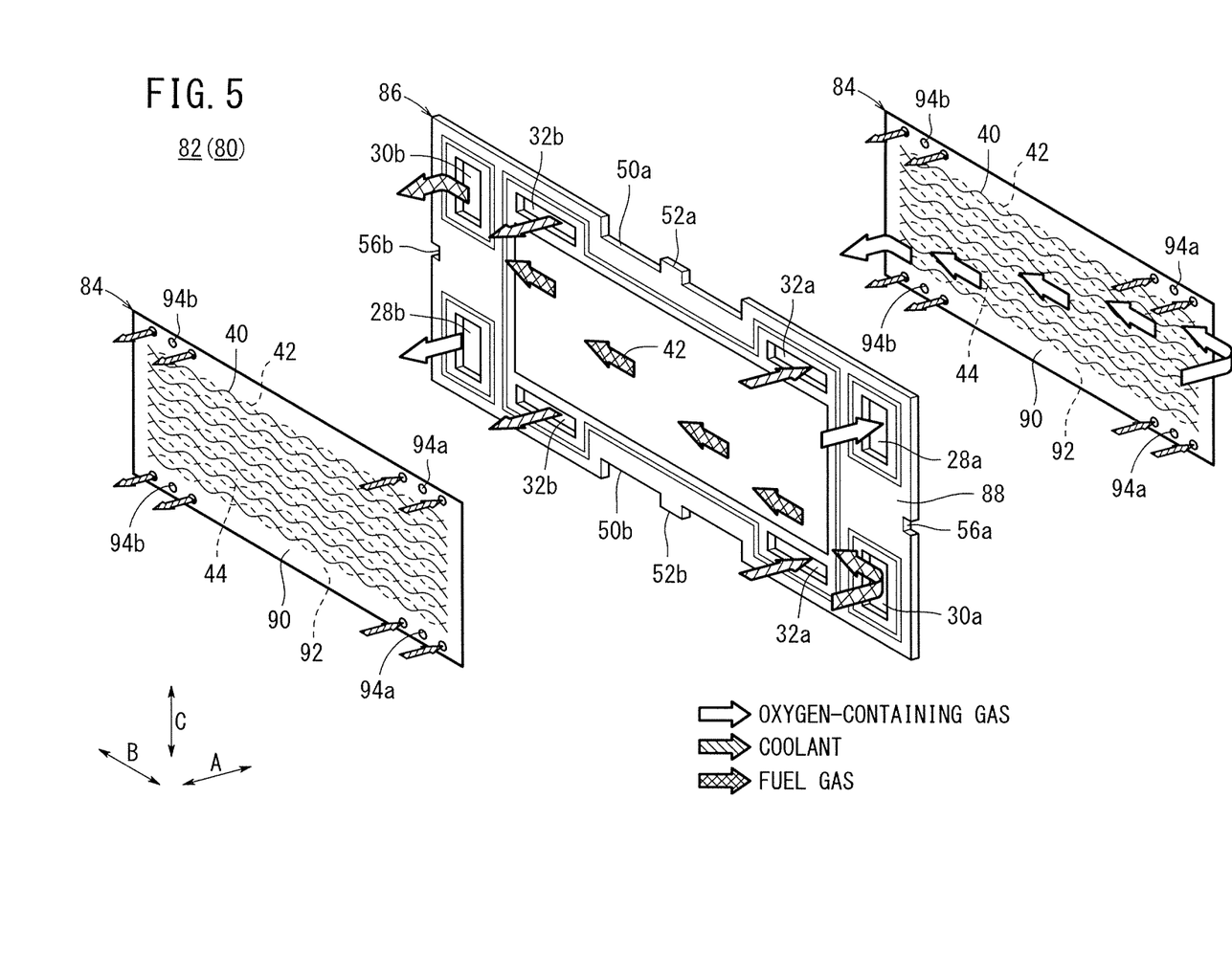
FIG. 5 is an exploded perspective view showing a fuel cell of a fuel cell stack according to a second embodiment of the present invention.

FIG. 5 is an exploded perspective view showing a fuel cell 82 of a fuel cell stack 80 according to a second embodiment of the present invention. The constituent elements that are identical to those of the fuel cell stack 10 according to the first embodiment are labeled with the same reference numerals, and description thereof will be omitted. Also in a third embodiment as described later, the constituent elements that are identical to those of the fuel cell stack 10 according to the first embodiment are labeled with the same reference numerals, and description thereof will be omitted.

Figure 6:
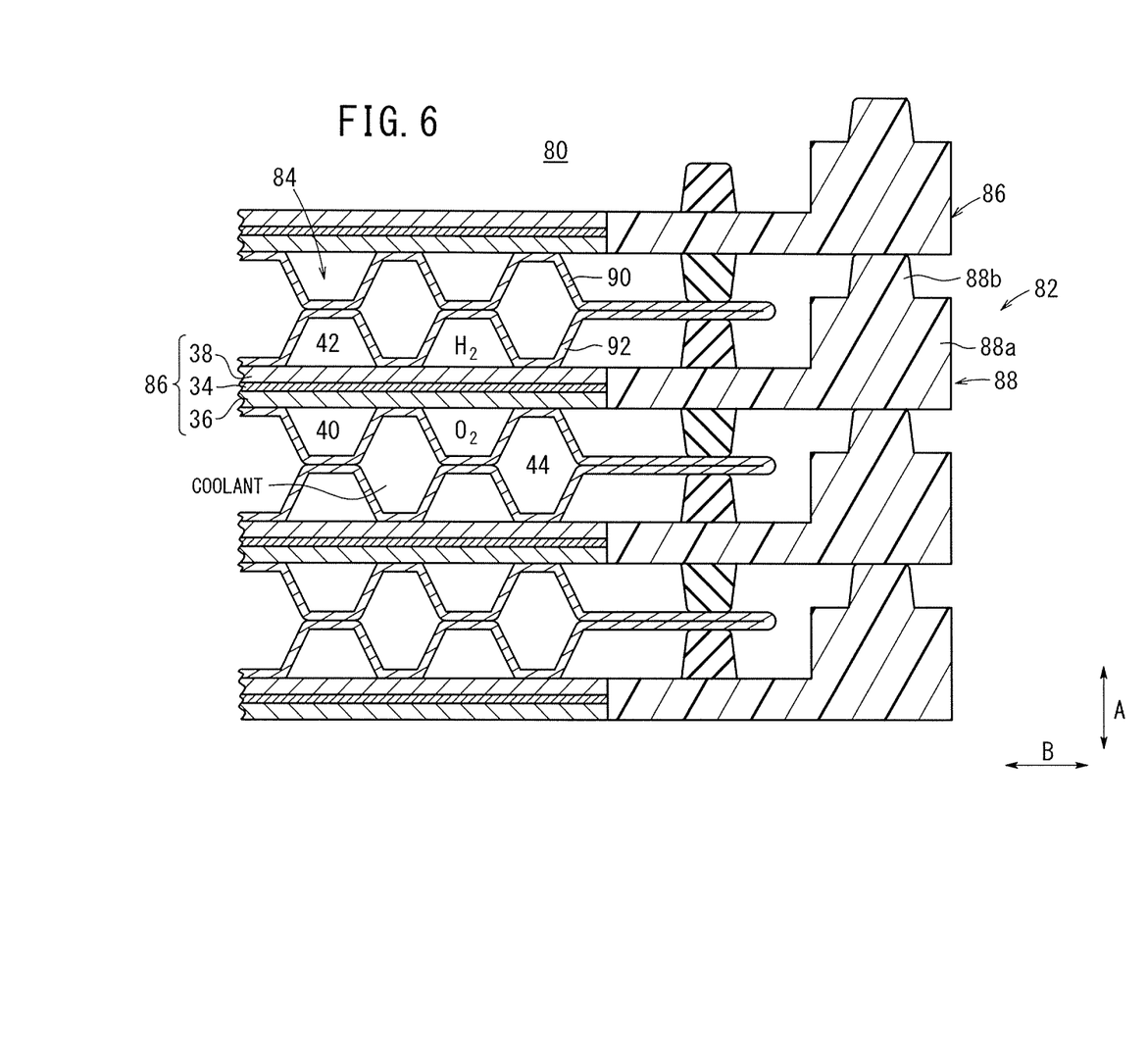
FIG. 6 is a partial cross sectional view showing the fuel cell stack.

The fuel cell 82 includes metal separators 84 and a membrane electrode assembly 86. As shown in FIG. 6, in the membrane electrode assembly 86, the surface size of the solid polymer electrolyte membrane 34 is the same as the surface size of the cathode 36 and the surface size of the anode 38, or larger than the surface size of the cathode 36 and the surface area of the anode 38. An insulative resin frame (resin frame member) 88 is formed integrally with the outer end of the solid polymer electrolyte membrane 34, e.g., by injection molding. As the resin material, general purpose plastic may be adopted. Alternatively, for example, engineering plastic, super engineering plastic or the like may be adopted.

On one surface of the frame 88, for example, on the side where the anode 38 (or the cathode 36) is provided, a thick section 88a is expanded in the thickness direction along the outer periphery. The thick section 88a has a predetermined width. A protrusion (resin section) 88b protruding in the direction indicated by the arrow A is formed integrally with the front end surface of the thick section 88a. The protrusion 88b is provided at the front end surface of the thick section 88a, along the outer periphery of the frame 88. Alternatively, the protrusion 88b may be formed of an elastic member separately from the thick section 88a.

As shown in FIG. 5, an oxygen-containing gas supply passage 28a, a fuel gas supply passage 30a, an oxygen-containing gas discharge passage 28b, a fuel gas discharge passage 30b, coolant supply passages 32a, and coolant discharge passages 32b are formed in the frame 88, and these fluid passages are not provided in the metal separator 84. The extensions 52a, 52b are provided integrally with the central portions of both of the long sides of the frame 88 through the cutouts 50a, 50b. The recessed portions 56a, 56b are directly formed at substantially the intermediate portions of both of the short sides of the frame 88.

For example, the metal separators 84 are made of metal plates such as steel plates, stainless steel plates, aluminum plates, plated steel sheets, or thin metal plates having anti-corrosive surfaces by surface treatment. As shown in FIGS. 5 and 6, each of the metal separators 84 is formed by folding a single metal plate, or joining two metal plates together.

The metal separator 84 has an oxygen-containing gas flow field 40 on its surface 90 facing the cathode 36. The oxygen-containing gas flow field 40 having a corrugated shape in cross section is formed by pressing to make the wavy corrugation. The metal separator 84 has a fuel gas flow field 42 on its surface 92 facing the anode 38. The fuel gas flow field 42 having a corrugated shape in cross section is formed by pressing to make the wavy corrugation. The corrugation phase of the oxygen-containing gas flow field 40 is opposite to the corrugation phase of the fuel gas flow field 42, and a coolant flow field 44 is formed inside the metal separator 84, between these phases. As shown in FIG. 5, on the surface 90 facing the cathode 36, coolant supply holes 94a and coolant discharge holes 94b are formed on both of upper and lower sides of the oxygen-containing gas flow field 40.

A first end plate 18a and a second end plate 18b are provided at both ends of the fuel cell stack 80 in the stacking direction, substantially in the same manner as in the case of the fuel cell stack 10 shown in FIG. 1. The first end plate 18a and the second end plate 18b are tightly fixed by first tightening members 20a and second tightening members 20b.

In the second embodiment, the extensions 52a, 52b formed on both of the long sides of the frames 88 of the membrane electrode assemblies 86 are engaged with the recessed portion 64 provided in each of the first tightening members 20a. Further, the ridge 76 provided in each of the second tightening member 20b is engaged with the recessed portions 56a, 56b formed on both of the short sides of the frames 88.

Thus, with simple and compact structure, the same advantages as in the case of the first embodiment are obtained. For example, positional displacement of the fuel cell 82 in the direction indicated by the arrow B is suppressed as much as possible.

Figure 7:
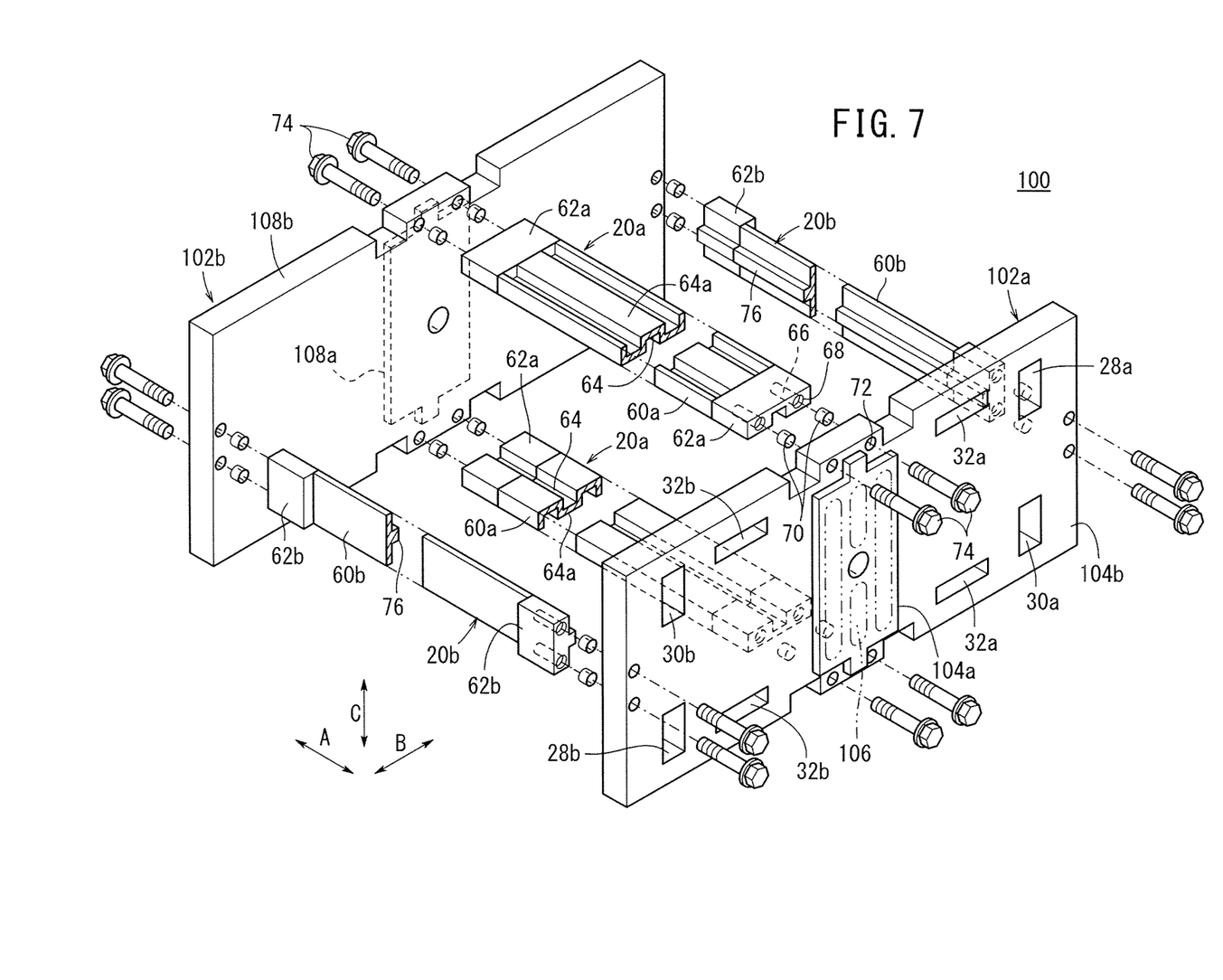
FIG. 7 is an exploded perspective view showing end plates, first tightening members, and second tightening members of a fuel cell stack according to a third embodiment of the present invention.

As shown in FIG. 7, a fuel cell stack 100 according to a third embodiment of the present invention includes a first end plate 102a and a second end plate 102b. The first end plate 102a includes a thick section 104a provided at a central portion in a lateral direction indicated by an arrow B, between a pair of first tightening members 20a. The portion of the first end plate 102a other than the thick section 104a is a thin section 104b thinner than the thick section 104a. The thick section 104a may be configured to have a rib shape by providing hollow portions 106.

The second end plate 102b includes a thick section 108a provided at a central portion in the lateral direction indicated by the arrow B, between the pair of first tightening members 20a. The portion of the second end plate 102b other than the thick section 108a is a thin section 108b thinner than the thick section 108a. The thick section 108a may be configured to have a rib shape by providing hollow portions (not shown).

In the third embodiment, the thick sections 104a, 108a are provided at central portions of the first end plate 102a and the second end plate 102b in the lateral direction, respectively. In the first end plate 102a and the second end plate 102b each having a rectangular shape elongated in the lateral direction, distribution in the received tightening load is not uniform. In particular, the tightening load is significantly applied to the central portions of long sides to which the first tightening members 20a are attached. Therefore, the first end plate 102a and the second end plate 102b may be deformed undesirably.

In this regard, the thick sections 104a, 108a are provided at the central portions of the first end plate 102a and the second end plate 102b in the lateral direction. In the structure, it is possible to reliably suppress deformation of the first end plate 102a and the second end plate 102b.

Further, in the first end plate 102a and the second end plate 102b, the thin sections 104b, 108b are provided in the portions other than the thick sections 104a, 108a. In the structure, the first end plate 102a and the second end plate 102b are not heavy as a whole, and weight reduction is achieved easily.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell stack comprising a plurality of fuel cells arranged in a stacked configuration, and a first end plate and a second end plate each having a laterally elongated shape, the first end plate and the second end plate being provided at respective ends, in a stacking direction, of the stacked configuration of fuel cells, the fuel cells each formed by stacking a membrane electrode assembly and a separator horizontally in a stacking direction, the separator having a substantially rectangular shape including two long sides and two short sides, central portions of the long sides of the separator being cut inwardly to form substantially rectangular cutouts, the membrane electrode assembly including a pair of electrodes and an electrolyte membrane interposed between the electrodes, the fuel cell stack further comprising:

a first tightening member coupling a long side of the first end plate and a long side of the second end plate, and extending in the stacking direction, the first tightening member configured to fit into one of the cutouts of the separator, and a second tightening member coupling a short side of the first end plate and a short side of the second end plate, and extending in the stacking direction, the second tightening member having a cross-sectional shape which is different from a cross-sectional shape of the first tightening member;

wherein, in the fuel cell, an extension is formed inside one of the cutouts on the long side; and the first tightening member has a first recessed groove portion formed therein and engaged with a plurality of the extensions such that the extensions are fitted into the first recessed groove portion, and the first recessed groove portion extends in the stacking direction;

wherein, in the fuel cell, a second recessed groove portion is formed on the short side; and the second tightening member has an outwardly extending ridge formed thereon and engaged with a plurality of the second recessed groove portions such that the ridge is fitted into the second recessed groove portions, and the ridge extends in the stacking direction.

2. The fuel cell stack according to claim 1, wherein the fuel cell has a laterally elongated shape in a front view, and a plurality of fluid passages are provided at both ends of the fuel cell in a longitudinal direction for allowing a fuel gas, an oxygen-containing gas, and a coolant to flow separately in the stacking direction; and the extension is positioned at a central portion of at least one of the long sides.

3. The fuel cell stack according to claim 1, wherein an outer surface of the first tightening member is positioned inside an outer surface of the long side of the fuel cell.

4. The fuel cell stack according to claim 1, wherein: the fuel cell has a laterally elongated shape in a front view, and a plurality of fluid passages are provided at both ends of the fuel cell in a longitudinal direction for allowing a fuel gas, an oxygen-containing gas, and a coolant to flow separately in the stacking direction; and the recessed portion is positioned at an intermediate portion of the short side the fuel cell, between the fluid passages.

5. The fuel cell stack according to claim 1, wherein the first end plate and the second end plate are tightly coupled to each end of the first tightening member using two screw members, and ring members are provided concentrically around the screw members; and the first end plate and the second end plate are tightly coupled to each end of the second tightening member using two screw members, and ring members are provided concentrically around the screw members.

6. The fuel cell stack according to claim 5, wherein the ring members are fitted to both of holes provided in the first end plate and the second end plate and holes provided in the first tightening member and the second tightening member.

7. The fuel cell stack according to claim 1, wherein each of the first end plate and the second end plate includes a thick section at a central portion in a lateral direction, between a pair of the first tightening members, and the thick section is thicker than another portion.

8. The fuel cell stack according to claim 1, wherein the first tightening member comprises a plate section, and an attachment section fixed to an end of the plate section in a longitudinal direction, the attachment section having threaded screw holes formed therein.

9. A fuel cell stack comprising a plurality of fuel cells arranged in a stacked configuration, and a first end plate and a second end plate each having a substantially rectangular shape including two long sides and two short sides, the first end plate and the second end plate being provided at respective ends, in a stacking direction, of the stacked configuration of fuel cells in the stacking direction, the fuel cells each formed by stacking a membrane electrode assembly and a separator horizontally in a stacking direction, the separator having a substantially rectangular shape including two long sides and two short sides, central portions of the long sides of the separator being cut inwardly to form substantially rectangular cutouts, the membrane electrode assembly including a pair of electrodes and an electrolyte membrane interposed between the electrodes, the fuel cell stack further comprising:

a pair of first coupling bars extending in the stacking direction between respective long sides of the first and second end plates, the first coupling bars having a first cross-sectional shape and being configured to fit in the cutouts of the separator; and a pair of second coupling bars extending in the stacking direction between respective short sides of the first and second end plates, the second coupling bars having a second cross-sectional shape which is different from the first cross-sectional shape;

wherein, in the fuel cell, an extension is formed inside each of the cutouts on the long side; and a first tightening member has a first recessed groove portion formed therein and engaged with a plurality of the extensions such that the extensions are fitted into the first recessed groove portion, and the first recessed groove portion extends in the stacking direction;

wherein, in the fuel cell, a second recessed groove portion is formed on each of the short sides; and each of the second coupling bars has an outwardly extending ridge formed thereon and engaged with a plurality of the second recessed groove portions such that the ridge is fitted into the second recessed groove portions, and the ridge extends in the stacking direction.

10. The fuel cell stack according to claim 1, wherein both of the end plates have a substantially similar outer profile shape, and wherein the tightening members are positioned inside of the outer profile of the end plates.

11. The fuel cell stack according to claim 9, wherein both of the end plates have a substantially similar outer profile shape, and wherein all of the coupling bars are positioned inside of the outer profile of the end plates.

12. The fuel cell stack according to claim 1, wherein the tightening members are entirely disposed between the end plates.

13. The fuel cell stack according to claim 9, wherein the coupling bars are entirely disposed between the end plates.

* * * * *